United States Patent [19]
Schmitt et al.

[11] 3,882,085
[45] May 6, 1975

[54] POLYAMIDE POLYMERS FROM AMINO POLYAMIDE REACTANTS

[75] Inventors: Karl Schmitt, Herne; Fritz Gude, Wanne-Eickel; Siegfried Brandt, Herne, all of Germany

[73] Assignee: Veba Chemie Aktiengesellschaft, Wanne-Eickel, Germany

[22] Filed: June 5, 1972

[21] Appl. No.: 259,643

Related U.S. Application Data

[63] Continuation of Ser. No. 24,854, April 1, 1970, abandoned.

[30] Foreign Application Priority Data
Apr. 3, 1969 Germany.................. 1917274

[52] U.S. Cl.......... 260/65; 260/29.2 N; 260/33.4 R; 260/47 CP; 260/78 A; 260/78 TF
[51] Int. Cl........................................... C08g 20/32
[58] Field of Search ....... 260/78 AE, 78 TF, 47 CP, 260/65, 78 A

[56] References Cited
UNITED STATES PATENTS

| | | | |
|---|---|---|---|
| 3,049,518 | 8/1962 | Stephens | 260/78 |
| 3,179,635 | 4/1965 | Frost et al. | 260/78 |
| 3,471,444 | 10/1969 | Sherer et al. | 260/65 |
| 3,554,984 | 1/1971 | George | 260/78 |

FOREIGN PATENTS OR APPLICATIONS
1,947,816  4/1971  Germany.................. 260/78 TF

*Primary Examiner*—Lester L. Lee
*Attorney, Agent, or Firm*—Burgess, Dinklage & Sprung

[57] ABSTRACT

Polyamide-acid precursors for polyimide polymers, the precursors being condensates or mixtures of tricarboxylic or tetracarboxylic acids, anhydrides or esters and primary amines characterized in that the moiety corresponding to the primary amine is a residue of a primary aminopolyamide.

4 Claims, No Drawings

POLYAMIDE POLYMERS FROM AMINO POLYAMIDE REACTANTS

This is a continuation of application Ser. No. 24,854, filed Apr. 1, 1970, now abandoned.

Processes are known for the preparation of polymers containing imide groups from diamines and tricarboxylic and/or tetracarboxylic acids or their condensable derivatives such as their esters or anhydrides, and it is often the practice first to prepared intermediates in the preparation of polyimides, namely the polyamide acids. The polyamide acids have the advantage over the polyimides of better solubility, and thus they make possible their ultimate use as principal agents in varnishes and molding compounds. To transform them to the polyimides, the polyamide acids are heated. The polyimides are furthermore accessible through the diamine salts of tetracarboxylic acid diesters by the application of heat.

One disadvantage of the prior-art methods of preparing polymers containing imide groups is the poor solubility of the polyamide acid preliminary products in solvents that are easy to handle, such as alcohols, and as a rule N-alkylated acid amides are used as solvents. The polyimides that are ultimately obtainable in this manner usually have poor stretching characteristics, so that their applications are greatly limited.

The invention is directed to the problem of preparing polyimides having improved qualities from preliminary products which are readily soluble in easily available solvents, especially in alcohols and water, and can even form films themselves.

This problem is solved according to the invention by using aminopolyamides as diamines. The reaction of the aminopolyamides is best performed in solvents containing alcohol. It is mostly aminopolyamides having terminal amino groups that are to be used. Such aminopolyamides can be prepared by known procedures, for example, by the condensation in the fused state of diamines of the formula $H_2N-R-NH_2$ with dicarboxylic acids of the formula $HOOC-R'-COOH$ or aminocarboxylic acids of the formula $H_2-N-R'-COOH$ or lactans thereof (R and R' = aliphatic, cycloaliphatic or aromatic radical having, respectively, from 2 to 38 carbon atoms), the diamine excess being made such that at least one amide group is formed.

Particularly suited for the performance of the process of the invention are aminopolyamides which have at least two to three amide bonds per molecule, such as those, for example, which are obtained in a known manner by the condensation in the fused stated of $n$ moles of dicarboxylic acid with $(n + 1)$ mole of diamine, $n$ being equal to, for example, 3. As a broad range for amide groups per molecule can be mentioned 1–30. As indicated, it is particularly contemplated that the molecules have terminal amino groups.

Suitable diamines of the formula $H_2N-R-NH_2$ are ethylenediamine, hexamethylenediamine, dodecamethylenediamine, diaminocyclohexane, diaminodicyclohexylmethane, benzidine, diaminophenyl oxide, and others. On account of their good solubility, aminopolyamides having little or no tendency to crystallization are especially suitable. Preferred among these are the aminopolyamides of the strongly branched aliphatic and cycloaliphatic diamines, such as 2,2,4- and/or 2,4,4-trimethylhexamethylene diamine and/or 1-amino-3-amino-methyl-3,5,5-trimethylcyclohexane, which are characterized by relatively high thermal stability and outstanding solubility.

Suitable dicarboxylic acids of the formula $HOOC-R'-COOH$ are aliphatic, cycloaliphatic and aromatic dicarboxylic acids in which the radical R' contains 1 to 38 carbon atoms, examples being adipic acid, sebacic acid, decanedicarboxylic acid, cyclohexane-1,4-dicarboxylic acid and terephthalic acid. Suitable amino acids or their lactams are E-caprolactam ω-aminoundecanic acid and laurin lactam. Especially suitable on account of their easy solubility in alcohols are the aminopolyamides of dicarboxylic acids having 4 to 12 carbon atoms, especially when the radical R' contains short branches, examples being 3-methyladipic acid or 2,2,4- and 2,4,4-trimethyladipic acid.

Tricarboxylic and/or tetracarboxylic acids and derivatives thereof functioning in the same way, e.g. esters, are used for the synthesis of the polyimide; examples are trimellitic acid anhydride, pyromellitic acid, pyromellitic acid dianhydride, tetrahydrofurantetracarboxylic acid, tetrahydrofurantetracarboxylic acid dianhydride, pyromellitic acid diester and acetophenonetetracarboxylic acid dianhydride. Particularly to be noted are pyromellitic acid and its derivatives, and tetrahydrofurantetracarboxylic acid and its derivatives, which can be reacted with the aminopolyamides used according to the invention to produce polyimide foreproducts having very good film-forming properties.

The molar ratio of the polycarboxylic acid for the imide synthesis, to the aminopolyamide is as a rule 1 : 1; differences of ±10% and more are tolerated.

The reaction of the aminopolyamides with the polycarboxylic acids or their derivatives to form polyimides or their precursors can take place under especially favorable conditions on account of the easy solubility of the aminopolyamides and reaction products. The reaction can be performed by dissolving the aminopolyamide together with a diester of a tetracarboxylic acid in alcohol, casting films with the alcoholic solution—after brief heating in some cases—and transforming the films to the polyimides by heating at higher temperatures. Also, an intermediate product made of aminopolyamide and excess polycarboxylic acid or of polycarboxylic acid and excess aminopolyamide can be prepared and reacted with the amount of aminopolyamide or polycarboxylic acid, as the case may be equivalent to the deficiency. The reaction of tetracarboxylic acid dianhydrides with the aminopolyamides used according to the invention, when performed in inert solvents, gives polyamide acids which are soluble in alcohols.

One particularly interesting embodiment of the process of the invention makes use of polyamide acids which are water-soluble in salt form. In this case, polyamide acids which have been prepared preferably from aminopolyamides having equivalent weights under 1,000 are isolated by distilling away the inert solvent or an aqueous solution is made of them by the simultaneous addition of $NH_3$ or amines and water. Film material can be made from the aqueous solutions and its condensation to the polyimide can be completed by heating.

The imide-containing plastics that can be made according to the invention are hard and tough. Since their foreproducts are easily soluble in easy-to-handle and nonhazardous solvents, they can be used for the preparation of varnishes and sheet materials, and also as binding agents for molding compounds, a special advantage being offered by the fact that very little water

EXAMPLE 1

1 mole of an aminopolyamide prepared from 3 moles of hexamethylenediamine, 8 moles of 2,2,4-trimethylhexamethylenediamine and 10 moles of decanedicarboxylic acid (1, 10) is dissolved in isopropanol. To this solution, whose concentration amounts to about 25 wt-%, 1 mole of pyromellitic acid dianhydride is added and dissolved by vigorous stirring. The solution is thinned as required and used as a varnish. A 35% polyamide acid solution obtained in this manner is applied to sheet steel which, after the evaporation of the solvent, is heated for hour at 160°C. The varnish coating is glossy, hard and flexible and adheres to the metal.

EXAMPLE 2

One mole of an aminopolyamide prepared from 3 moles of 2,4,4-trimethylhexamethylenediamine, 1 mole of 1-amino-3-aminomethyl-3,5,5-trimethylcyclohexane, 1 mole of terephthalic acid and 2 moles of azelaic acid, is dissolved in isopropanol. To this solution, whose concentration amounts to about 20 wt-%, 1 mole of tetrahydrofurantetracarboxylic acid dianhydride is added and dissolved by vigorous stirring. Kaolin powder is stirred into this solution. The slurry is then press-filtered and dried to form a molding compound which is worked by heating to 180°C under simultaneous pressure.

EXAMPLE 3

One mole of an aminopolyamide prepared from 1.5 moles of 2,2,4-trimethylhexamethylenediamine, 1.5 moles of 2,4,4-trimethylhexamethylenediamine and 2 moles of adipic acid, is dissolved in isopropanol. To the 30% solution there is added, with vigorous stirring, a 20% solution of 1 mole of pyromellitic acid dianhydride in dimethyl formamide. Then the solvent mixture is distilled off, and finally water and 1 mole of $NH_3$ is added. The aqueous solution is adjusted to a concentration of 30% and brushed onto sheet steel. After drying in air, the sheet is heated at 170°C for half an hour. The varnish film is glossy, hard and flexible.

EXAMPLE 4

An aminopolyamide is prepared from 1.5 mole of 2,2,4-trimethylhexamethylenediamine, 1.5 mole of 2,4,4-trimethyl-hexamethylenediamine, 2 moles of adipic acid and 1 mole of caprolactam by condensation in the molten state. One mole of the aminopolyamide is dissolved in ethanol. 1 mole of tetrahydrofurantetracarboxylic acid diethyl ester is added to the approximately 25% solution and the mixture is briefly heated at ebullition. A portion of the solution is applied to a polished metal plate treated with parting agent, the film is dried, and the plate is heated for ½ hour at 150°C. After it has cooled a sheet can be pulled from it which is very flexible and has a high strength. It can be used as a wrapping material.

EXAMPLE 5

One mole of an aminopolyamide prepared from 4 moles of dodecamethylenediamine (1, 12) and 3 moles of 2,2,4-trimethyladipic acid is dissolved in isopropanol. 1 mole of pyromellitic acid dianhydride is added to the approximately 25% solution and dissolved by vigorous stirring. After half an hour of heating at 80°C the solution is used as a varnish.

EXAMPLE 6

A polyamide prepared from 2 moles of sebacic acid and 3 moles of dodecamethylenediamine (1, 12) was reacted with 1 mole of pyromellitic acid dianhydride to form a polyamide acid. This was dissolved in ammonia water and applied to sheet steel with a "Lackhantel." The film was dried for 5 hours at 90°C.

The Erichsen cupping test according DIN 53136 can be used as an index of the completeness of the setting action.

30 minutes of heating at 170°C was necessary to achieve an Erichsen cupping of 9 mm with a coating thickness of 30.

The same solution was thinned to about 12% and applied to a steel plate in an electrophoresis bath at 130 volts. The plate was rinsed off with distilled water and dried for 4 hours at 90°C. Heating at 150°C for only 20 minutes was required for the achievement of an Erichsen cupping of 9 millimeters.

A summary of the disclosure and further disclosure is contained in Tables 1, 2 and 3.

TABLE 1 - DIAMINES

Generic Disclosure

Diamines of the formula $H_2N$-R-$NH_2$, wherein R is aliphatic, cycloaliphatic or aromatic (e.g. mono-, bi-, or tri-nuclear), $C_2$-$C_{30}$, preferably $C_2$-$C_{14}$.

| Specific Disclosure | R | R | Examples |
|---|---|---|---|
| 1) ethylene diamine | aliphatic | $C_2$ | |
| 2) hexmethylene diamine (1,6) | aliphatic | $C_6$ | 1 |
| 3) dodecamethylene diamine (1,12) | aliphatic | $C_{12}$ | 5,6 |
| 4) diamino cyclohexane | cyclo- aliphatic | $C_6$ | |
| 5) diaminodicyclo- hexylmethane | cyclo- aliphatic | $C_{13}$ | |
| 6) benzidine | aromatic (dinuclear) | $C_{12}$ | |
| 7) diaminophenyl oxide | aromatic | $C_6$ | |
| 8) 2,2,4-trimethyl- hexamethylene diamine | aliphatic | $C_9$ | 1,3,4 |
| 9) 2,4,4-trimethyl- hexamethylene diamine | aliphatic branched | $C_9$ | 2,3,4 |
| 10) 1-amino-3- aminomethyl- 3,5,5-trimethyl cyclohexane | cyclo- aliphatic, branched | $C_{10}$ | 2 |

TABLE 2 - DICARBOXYLIC ACIDS

Generic Disclosure

Dicarboxylic acids of the formula HOOC-R'-COOH,wherein R' is aliphatic,cycloaliphatic or aromatic,$C_1$-$C_{30}$,preferably $C_2$-$C_{12}$ or $C_4$-$C_{12}$ and desirably wherein R' includes a branch or branches of lower alkyl groups or lower alkyl substituents.

| Specific Disclosure | R' | R' | Examples |
|---|---|---|---|
| 1) adipic acid | aliphatic | $C_4$ | 3,4 |
| 2) sebacic acid | aliphatic | $C_8$ | 6 |
| 3) decane- dicarboxylic acid (1,10) | aliphatic | $C_{10}$ | 1 |
| 4) cylohexane- 1,4-dicarboxylic acid | cyclo- aliphatic | $C_6$ | |
| 5) terephthalic acid | aromatic | $C_6$ | 2 |
| 6) 3-methyl- adipic acid | aliphatic | $C_5$ | |

TABLE 2 - DICARBOXYLIC ACIDS-Continued

Generic Disclosure

Dicarboxylic acids of the formula HOOC-R'-COOH,wherein R' is aliphatic,cycloaliphatic or aromatic,$C_1$-$C_{36}$,preferably $C_2$-$C_{12}$ or $C_4$-$C_{12}$ and desirably wherein R' includes a branch or branches of lower alkyl groups or lower alkyl substituents.

| Specific Disclosure | R' | R' | Examples |
|---|---|---|---|
| 7) 2,2,4-trimethyl-adipic acid | aliphatic | $C_7$ | 5 |
| 8) 2,4,4-trimethyl-adipic acid | aliphatic | $C_7$ |  |
| 9) azelaic | aliphatic | $C_7$ | 2 |

TABLE 3 - AMINO ACIDS OR THEIR LACTAMS

Generic Disclosure

Amino carboxylic acids of the formula $H_2N$-R'-COOH,wherein R' is aliphatic, cycloaliphatic or aromatic, $C_1$-$C_{30}$.

| Specific Disclosure | R' | R' | Examples |
|---|---|---|---|
| 1) W-amino-undecanic acid | aliphatic | $C_{10}$ |  |
| 2) -capro-lactam | aliphatic | $C_5$ | 4 |
| 3) W-laurin lactam | aliphatic | $C_{11}$ |  |

TABLE 4

Generic Disclosure

Tricarboxylic and tetracarboxylic acids and their derivatives functioning in the same way, including the anhydrides and esters.

| Specific Disclosure | Example |
|---|---|
| 1) trimellitic acid |  |
| 2) pyromellitic acid | 1,3,5,6 |
| 3) tetrahydrofurantetracarboxylic acid | 2,4 |
| 4) acetophenonetetracarboxylic acid |  |

Thus the invention provides polyamide-acid precursors which are condensates, or mixture (e.g. solutions) for condensation, of tricarboxylic or tetracarboxylic acids, anhydrides, or esters, particularly those acids, or their derivatives functioning in the same way, having two carboxylic groups on next adjacent carbon atoms, in the case of the tricarboxylic acids (e.g. trimellitic acid), and pairs of carboxylic groups on next adjacent carbon atoms in the case of the tetracarboxylic acids (e.g. pyromellitic acid). The acid or acid derivatives can be reacted in well known ways with primary amines, preferably diprimary diamines, of such character that the moiety in the precursor corresponding to the amine is a residue of a primary aminopolyamide. Branched, e.g. by alkyl substituents of 1-4, or 1-2, especially methyl groups, aliphatic amines and similarly substituted cycloaliphatic amines are preferred. The acid residue of the aminopolyamide moieties can be the residues of a dicarboxylic acids, or amino carboxylic acids; the use of lactams is equivalent to the use of amino acids. The aminopolyamides are made by known procedures.

The precursors are soluble in alcohol for formation of solutions of, for example, 10 to 80, preferably 30 to 70 weight percent of precursor. The alcohol can be a lower aliphatic alcohol of 1 to 5 carbon atoms; preferred alcohols being isopropanol and ethanol.

The condensate precursors (polyamide acids), in the form of the ammonia or amine salts thereof, are also soluble in water, in which the concentration can be 3 to 80 weight percent, preferably 5 to 50 weight percent of the salt.

As mentioned the aminopolyamide can have an equivalent weight of less than 1000. It is preferable at least 125. By equivalent weight is meant the weight corresponding to each primary amino group.

The following formula is indicative of the recurring structural unit of the polyamide-acid precursors.

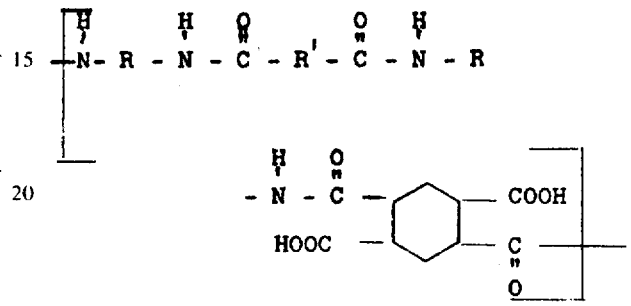

In this formula, the aminopolyamide residue is of an aminopolyamide of 1 dicarboxylic group and 2 diprimary diamines. In the aminopolyamides, if $n$ is the moles of dicarboxylic residue, the moles of diamine residues is preferably $n + 1$. The $n$ value can be, for example, 1-15, preferably 1-12. in Examples 1-6, $n$ is, respectively, 10, 3, 2, 2, 3, 2.

The primary aminopolyamides referred to herein are primary aminopolycarboxylamides.

What is claimed is:

1. Polyamide-precursors for polyamide polymers, the precursors being condensates or mixtures of condensates of a tetracarboxylic acid, anhydride or ester thereof with at least one aminopolyamide which comprises the condensate of $n+1$ mols of a diamine of the formula $H_2N$-R-$NH_2$, said diamine selected from the group consisting of 2,2,4-trimethylhexamethylene diamine, 2,4,4-trimethylhexamethylene diamine and 1-amino-3-aminomethyl-3,5,5-trimethylcyclohexane with $n$ mols of at least one acid selected from the group consisting of a dicarboxylic acid and an amino acid.

2. A polyamide-acid precursor according to claim 1 wherein the diamine is condensed with a dicarboxylic acid and said dicarboxylic acid is selected from the group consisting of adipic acid, sebacic acid, decane dicarboxylic acid, cyclohexane-1,4-dicarboxylic acid and terephthalic acid.

3. A polyamide-acid precursor according to claim 1, wherein said diamine is condensed with an amino acid and said amino acid is ω-aminoundecanic acid or the acid of E-caprolactam or laurin lactam.

4. A polyamide-acid precursor according to claim 1 wherein said tetracarboxylic acid anhydride or ester is selected from the group consisting of pyromellitic acid, pyromellitic acid dianhydride, tetrahydrofurantetracarboxylic acid, tetrahydrofurantetracarboxylic acid dianhydride, a pyromellitic acid diester and acetophenonetetracarboxylic acid dianhydride.

* * * * *